Oct. 24, 1939.  G. W. MATTSON  2,177,074
SELF-PROPELLED WATER VEHICLE
Filed July 25, 1936  3 Sheets-Sheet 1
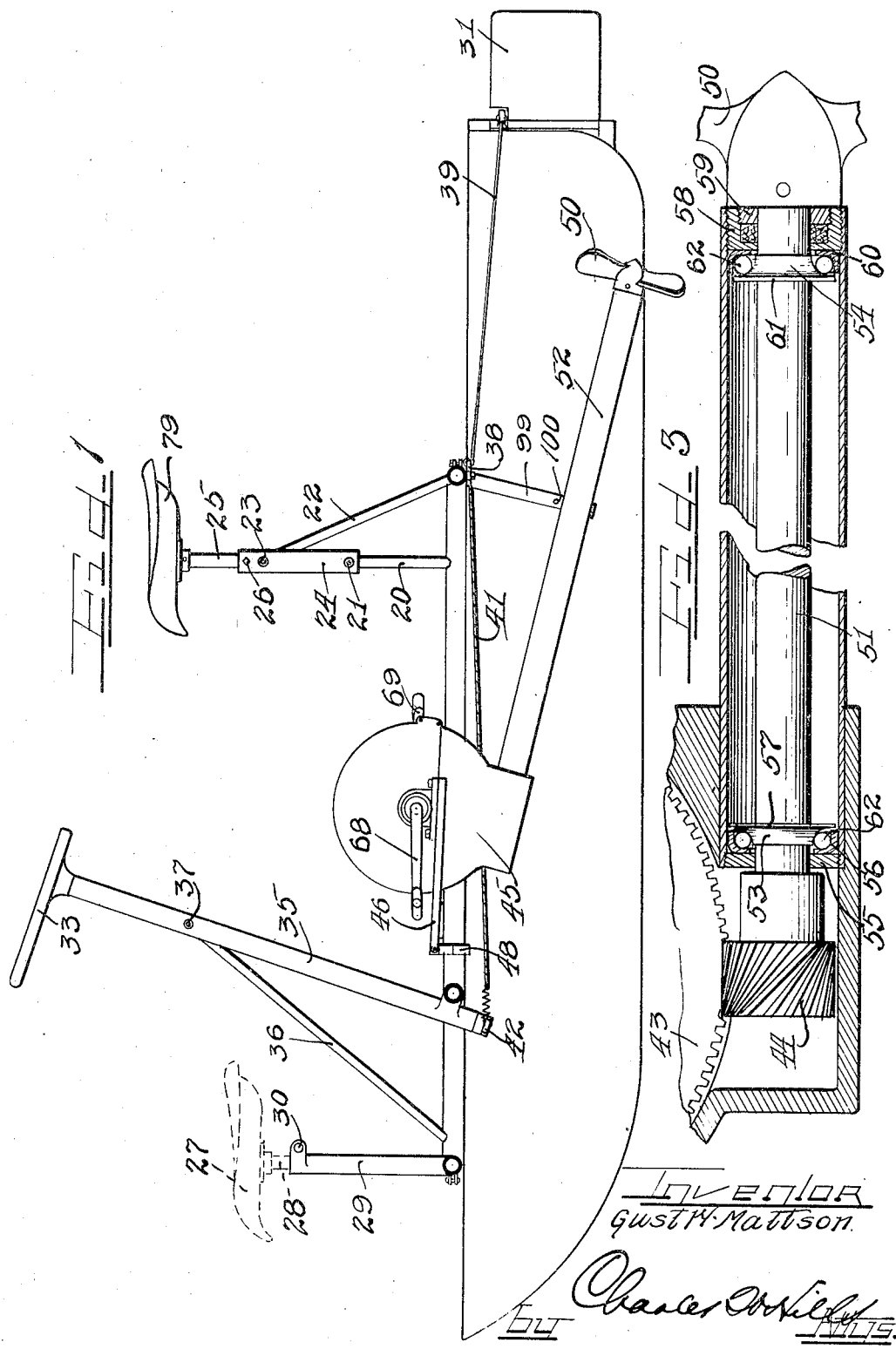
Inventor
Gust W. Mattson Oct. 24, 1939.                G. W. MATTSON                 2,177,074
                        SELF-PROPELLED WATER VEHICLE
                    Filed July 25, 1936        3 Sheets-Sheet 2
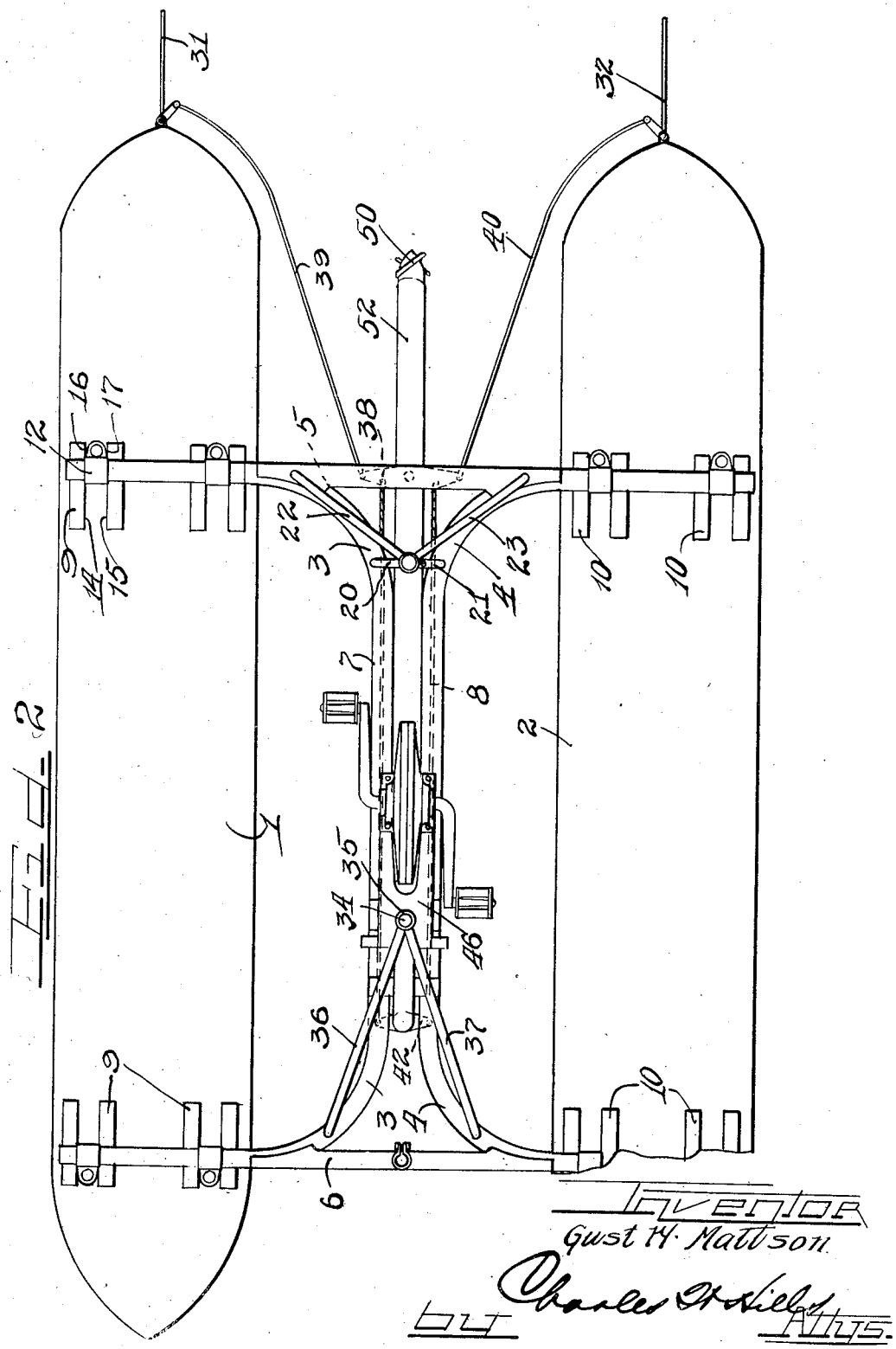

Oct. 24, 1939.  G. W. MATTSON  2,177,074
SELF-PROPELLED WATER VEHICLE
Filed July 25, 1936
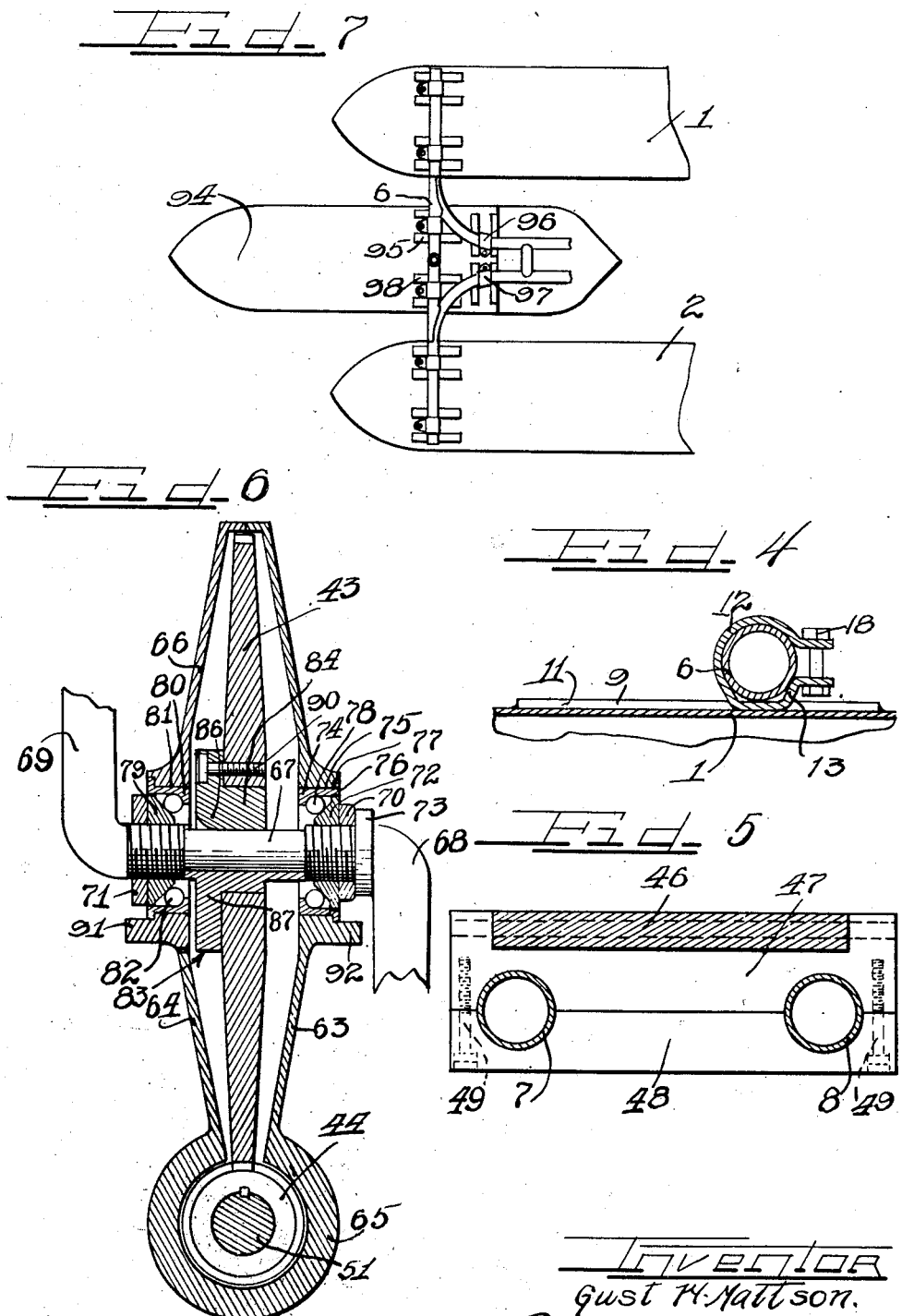
Inventor
Gust W. Mattson.

Patented Oct. 24, 1939

2,177,074

UNITED STATES PATENT OFFICE 2,177,074

SELF-PROPELLED WATER VEHICLE

Gust W. Mattson, Chicago, Ill.

Application July 25, 1936, Serial No. 92,519

3 Claims. (Cl. 115—25)

This invention relates to a water vehicle and more particularly to a self-propelled water vehicle of the pontoon type.

Many self-propelled water vehicles have been developed in the past. These vehicles for the most part have either been relatively expensive to manufacture or else they have not possessed the desired degree of stability when afloat. It is an object of this invention to provide a novel form of water vehicle which possesses the desired degree of stability when afloat, which is economical to manufacture, and which is rugged and reliable in use.

A further object of this invention is to provide a novel form of frame construction for self-propelled water vehicles of the pontoon type.

It is a still further object of this invention to provide a novel form of steering mechanism for water vehicles having at least two rudders.

It is a still further object of this invention to provide a novel propulsion mechanism and means for mounting the same on water vehicles.

Another object of this invention resides in a novel form of drive gear housing and mounting which is particularly applicable where the drive gear is mounted on a double arm crank shaft.

A further object of this invention is to provide a novel housing and method of lubricating the same for the propeller shaft.

A still further object of this invention resides in the use of an auxiliary pontoon for a double pontooned water vehicle when an additional predetermined auxiliary load is being carried by the water vehicle.

A still further object of this invention resides in a novel form of bracket which may be built from a single sheet of material.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawings in which:

Figure 1 is an elevational view partly in cross section of a self propelled water vehicle illustrating one embodiment of my invention;

Figure 2 is a cross sectional plan view of the preferred embodiment of my invention taken along the line II—II of Figure 1;

Figure 3 is a cross sectional view of the propeller shaft and propeller shaft housing of the preferred embodiment of my invention;

Figure 4 is an elevational view of a bracket of the type which is employed to secure the water vehicle frame structure to the pontoons;

Figure 5 is an elevational view of the bracket which pivotally supports the bifurcated arm upon which the propulsion mechanism is mounted;

Figure 6 is an elevational view partly in cross section of the drive gear housing assembly employed in the preferred embodiment of my invention; and Figure 7 is a fragmentary plan view of a modified form of my invention employing an auxiliary pontoon.

Referring now to Figures 1 and 2, the self-propelled water vehicle exemplifying the preferred embodiment of my invention includes a pair of spaced pontoons 1 and 2 upon which the pedal operated propulsion mechanism and the steering mechanism is mounted. Pontoons 1 and 2 may be fabricated from any suitable material or materials, but preferably a light weight sheet metal material is employed which may be welded in the desired shape.

It has been found that an exceptionally sturdy and economical type of frame construction for securing together pontoons 1 and 2 may be obtained by employing a double U-shaped frame, preferably of metal, having two U-shaped portions 3 and 4 interconnected, in a manner which will presently be described, by two transverse arms 5 and 6. U-shaped portions 3 and 4 are disposed in such a manner as will place their respective base parts 7 and 8 in relatively close proximity to each other. Opposite ends of arms 5 and 6 are secured to pontoons 1 and 2 respectively in any suitable manner such as by brackets 9 and 10.

Although various types of brackets may be used to secure the opposite ends of arms 5 and 6 to pontoons 1 and 2, it has been found that a bracket such as that illustrated in Figures 1 and 4 of the drawings may be employed with greater success than any bracket heretofore known. These brackets which form one of the important features of this invention are fabricated from a single sheet of metal and include a base portion 11 and two integral tongues 12 and 13. As may be seen upon close inspection of the drawings, the bracket is formed by making four longitudinal cuts 14, 15, 16, and 17 in the base part 11. Tongues 12 and 13 are then bent back into their desired shape to substantially surround the article to be held by the bracket. When these brackets are used on a water vehicle of the type herein described, the base portion 11 is secured to the top surface of a pontoon, preferably by spot welding, and tongues 12 and 13 are bent around one of the transverse arms in the manner shown in Figure 4 and then secured together by a bolt or rivet 18.

As may be seen upon close inspection of the drawings, the ends of U-shaped portions 3 and 4 are spliced into arms 5 and 6, and preferably they are brazed or welded at the junction point, although they may of course be bound together in any other suitable manner. Secured to the transverse arm 5, is a downwardly extending V-shaped bracket 99 through which the propeller shaft is adapted to extend. A transverse bolt 100 near the apex of the V may be employed if desired to secure the propeller shaft in its lowermost position.

A seat rest 19 is detachably mounted on the rear portion of the double U-shaped frame in the manner shown in the drawing. The seat rest frame includes a hollow cylindrical member 24 which is mounted on the double U-shaped frame by means of four angularly extending legs 20, 21, 22, and 23. Legs 20 and 21 are secured in any suitable manner to U-shaped portions 3 and 4 respectively such as by welding or brazing, while legs 22 and 23 are secured to transverse arm 5 in a similar manner. Seat rest 19 is provided with a downwardly extending portion 25 which is adapted to be journalled in the hollow cylindrical member 24. A set screw or other clamping means 26 adjustably secures seat rest 19 at its desired height in a manner which is well known to those skilled in the art.

An auxiliary seat rest 27 having a downwardly depending portion 28 is detachably mounted in a hollow cylindrical member 29 carried by the front portion of the double U-shaped frame. Depending portion 28 of seat rest 27 is journalled in the hollow cylindrical member 24 and may be retained in its desired position by means of a set screw or clamp 30. As shown in the drawings, the hollow cylindrical mounting member 29 is connected directly to the transverse arm 6 of the double U-shaped frame, it being secured thereto in any suitable manner such as by welding or brazing. As will readily be appreciated, seat rest 27 may be quickly dismounted from the water vehicle and removed, when only one person is being carried by the vehicle.

A novel form of steering mechanism has been provided for the self propelled water vehicle. Pivotally mounted at the rear of pontoons 1 and 2 are rudders 31 and 32 respectively which are adapted to be moved in unison in substantially a horizontal plane. The position of rudders 31 and 32 is determined by the position of a suitable steering handle 33 carried on the front part of the water vehicle. A control shaft 34 to which the handle 33 is secured is journalled in a control shaft housing 35. The lower end of housing 35 is secured to the double U-shaped frame and may be braced if desired by legs 36 and 37.

Intermediately disposed between the control shaft 34 and rudders 31 and 32 is an intermediate arm 38. Arm 38 is pivotally mounted at its center to the lower part of transverse arm 5. A pair of relatively rigid rods 39 and 40 connect rudders 31 and 32 respectively to the opposite ends of intermediate arm 38. As may be seen upon close inspection of the drawings, rods 39 and 40 are bent outwardly around the inner rear ends of pontoons 1 and 2 but are spaced therefrom. Intermediate arm 38 is moved by a flexible cable drive 41 connected to an arm 42 secured to the lower extremity of control shaft 34. It will be apparent from the above description that any angular movement of control handle 33 will be transmitted through the flexible cable 41 to the intermediate arm 38 and thence through rods 39 and 40 to rudders 31 and 32 respectively. The steering mechanism described above describes a simple means for moving the rudders on a water vehicle in unison without causing any frictional wear on the pontoons of the water vehicle.

The novel pedal operated propulsion mechanism which forms an important feature of this invention and which includes a driving member, a driven member, and a propeller, is pivotally mounted to the double U-shaped frame for angular movement in a vertical plane. More particularly, a drive gear 43 and a driven gear 44 meshed therewith are journalled in a suitable housing 45 which is carried by a bifurcated pivotally mounted arm 46 on the double U-shaped frame. More particularly, the bifurcated arm 46 is pivotally mounted in a bracket 47 which is adapted to be adjustably mounted on the base portions 7 and 8 of the double U-shaped frame (as may be seen best in Figure 5). Bracket 47 is provided with a suitable clamping base 48 which may be secured thereto in any suitable manner, such as by bolts 49.

As may be observed, base portions 7 and 8 of the double U-shaped frame are spaced just far enough apart to permit housing 45 to be disposed therebetween. It should also be noted that the width of the bifurcated arm 46 prevents unrestricted movement thereof in a vertical plane, since arm 46 will rest in its lowermost position on the top of base portions 7 and 8 of the double U-shaped frame. Since the bifurcated arm 46 in its normal position is disposed at an angle to the base portions 7 and 8 of the double U-shaped frame, it will be understood that a suitable cam block 101 may be wedged therebetween to hold arm 46 in its uppermost position with housing 52 and propeller shaft 51 held against the under side of cross bar 5.

The propeller 50 of the water vehicle is directly connected to the driven gear 44 of the propulsion mechanism by means of a propeller shaft 51. Extending from and secured to the drive gear housing 45 is a propeller shaft housing 52 which completely encloses a substantial portion of the propeller shaft 51. Shaft 51 is journalled in the housing 52 by means of two ball thrust and guide bearings, 53 and 54 respectively. A housing end plate 55 applies the desired end thrust to the stationary ball race 56 of bearing 53 against the movable truncated cone ball race 57 carried on propeller shaft 51.

A packing ring 58 abuts the outer end of bearing 54 and provides a substantially fluid tight running joint between propeller shaft 51 and the lower end of housing 52. A housing end plate 59 applies the desired end thrust through the packing ring 58 on the stationary ball race 60 against the movable truncated cone ball race 61 which is secured to the propeller shaft 51. Ball bearings 62 are disposed between ball races 56 and 57 and between ball races 60 and 61. A suitable fluid lubricant such as oil or a semi-fluid lubricant such as a light grease is placed in housing 52. As will readily be understood from the above description, the use of a housing of the type described permits practically the entire propeller shaft to run in oil, even though a substantial portion of the shaft is below the water line. It will readily be appreciated that with a construction of this type friction losses have been reduced to a minimum.

One of the important features of this invention is the structure of the drive gear housing assembly employed. Referring to Figure 6 of the drawings, the drive gear housing is indicated generally by the reference numeral 45. Housing 45 includes two disk shaped portions 63 and 64 and a lower cylindrical portion 65, the latter being adapted to enclose the driven gear 44. The upper part 66 of portion 64 of the housing is severed from the main body and is adapted to be removed therefrom. Extending through the central part of housing 45 is a drive shaft 67 having oppositely extending crank arms 68 and 69. Drive shaft 67 is rotatably mounted in housing 45 by means of suitable bearings 70 and 71 disposed on opposite sides of the housing and carried thereby. The moving element 72 of bearing 70 is adapted to be screwed onto drive shaft 67 against a shoulder 73 formed on the shaft. The inner edge of element 72 is conically shaped to form a suitable ball race for the bearing. The stationary element 74 of bearing 70 is pressed into a central opening 75 of the housing, and may, if desired, be provided with an outer flange shoulder 76 which fits into an outer recess 77 of housing 45. The inner surface of element 74 is shaped to provide a ball race for the bearings. Ball bearings 78 are provided between elements 74 and 72 in a manner well known to those skilled in the art.

Bearing 71 includes a movable element 79 which is screw threaded on shaft 67, the inner surface of which provides a suitable ball race for the bearing. Bearing 71 also includes a stationary element 80 which is adapted to be pressed into a central opening 81 of the housing in a manner similar to that described in connection with element 74 of bearing 70. Element 80 is provided with an inner ball race surface. Ball bearings 82 are disposed between elements 79 and 80 in a manner well known to those skilled in the art.

The novel means by which drive gear 43 is mounted on drive shaft 67 will now be described in detail. Drive gear 43 is mounted on a collar 83 having a hub portion 84 and a radial flange portion 85. Collar 83 is severed axially to form two parts 86 and 87. The lower part 87 differs from the upper part 86 in that it is provided with two oppositely extending shoulders 88 and 89 which are of sufficient length to extend into contact with the enlarged portions of shaft 67 upon which bearings 70 and 71 are mounted. Parts 86 and 87 are secured to drive gear 43 by any suitable means, such as by bolts 90. Housing 45 is provided with laterally extending shoulders 91 and 92 which are adapted to be secured to the bifurcated arm 46 (shown in Figure 1).

The manner in which drive gear 43 is assembled in housing 45 will now be described. The upper part 66 of housing 45 is removed. Element 72 of bearing 70 is screwed in position on drive shaft 67. Drive gear 43 and the lower part 87 of collar 83 are placed in the housing through the opening left therein by the removal of upper portion 66. The crank arm 69 of drive shaft 67 is now worked through the housing and through the drive gear 43 into its desired position. Part 87 of collar 83 is then secured to drive shaft 67 in any suitable manner, such as by a key 93. The upper part 86 of collar 83 is now worked into position in alignment with the lower part 87 and is then secured to drive gear 43 by bolts 90. Element 79 of bearing 71 is now worked down over the crank arm 65 and screwed into position on the enlarged portion of drive shaft 67, the ball bearings 82 having been disposed between the cooperating ball races of bearing 71.

It will readily be understood from the above description that had the upper part 86 of collar 83 been provided with axially extending portions which were of sufficient length to extend over to the respective bearings 70 and 71, it would not have been possible to insert the upper part into the position shown with a housing having a relatively small depth dimension. The oppositely extending shoulders 88 and 89 on lower part 87 of shoulder 83 are sufficient to center drive gear 43 in its desired position in the housing. It will thus be seen that I have provided an extremely simple yet compact drive gear housing assembly.

In Figure 7 of the drawings I have illustrated a slight modification of my invention wherein an auxiliary pontoon may be secured to the double U-shaped frame when an additional loading is placed on the water vehicle. It is apparent that if the normal weight which is carried by the water vehicle is properly distributed over pontoons 1 and 2 when one person is occupying the vehicle by seating himself in seat rest 19 that if the auxiliary seat rest 27 is occupied the total weight carried by the vehicle will no longer be equally disposed over the pontoon. I, therefore, propose to secure an additional or auxiliary pontoon 94 between pontoons 1 and 2 and forwardly thereof as shown in Figure 7 when an additional person or load is being carried on the forward part of the water vehicle. Auxiliary pontoon 94 may be secured in any suitable manner to the double U-shaped frame. Preferably, however, clamps or brackets similar to those previously described are employed as at 95, 96, 97, and 98.

It will be apparent that instead of mounting auxiliary seat rest 27 in upright member 29 that if desired a sail or other water equipment (not illustrated) may be supported by this member.

From the above description, it will be understood that I have provided an extremely simple and economical self propelled water vehicle. In certain specific instances it has been found that a self propelled vehicle built in accordance with the above teachings of this invention has a total weight of less than 100 pounds. It will thus be seen that the water vehicle is not only simple in design but is also extremely easy to handle both in the water and on land.

Although certain specific sub-combinational features of this invention are particularly applicable to self-propelled water vehicles, it will also be understood that they are not necessarily limited thereto.

While I have shown a particular embodiment of my invention, it will of course be understood that I do not wish to be limited thereto, since many modifications may be made, both in the manner of construction and in the instrumentalities employed, and I therefore contemplate by the appended claims to cover all such modifications as fall within the true spirit and scope of my invention.

I claim as my invention:

1. In a water vehicle, the combination including a supporting frame, a pedal operated vehicle propulsion mechanism, a mechanism supporting member pivotally mounted on said frame, means for changing the pivot point of said member, means for limiting the angular movement of said mechanism in a vertical plane, and a cam member disposed between said supporting member and said frame, said cam member being adapted to secure said mechanism in its uppermost position.

2. In a water vehicle, a pontoon structure including a pair of spaced pontoons and a frame for connecting and holding said pontoons in spaced relationship, a propeller for motivating said structure disposed at the rear of the same and below the water level, an upwardly inclined shaft positioned in the space between said pontoons and having its rear end connected to said propeller, a gear in said space carried by the upper end of said shaft in concentric relation therewith and disposed above the water level substantially midway of the length of the pontoon structure, gearing projecting above the pontoon structure and disposed directly over said shaft gear and in meshing relation therewith, said gearing including means for motivating the same to propel the vehicle through the water, a sealed thrust tube for inclosing said propeller shaft projecting below the water level with a fluid lubricant therein, and having thrust bearing means arranged to resist thrust incident to the operation of said shaft, and means provided for enabling the swinging of said shaft tube, shaft and propeller to raise said propeller upwardly in said space and out of the water.

3. In a water vehicle, a pontoon structure including a pair of spaced pontoons and a frame for connecting and holding said pontoons in spaced relationship, a propeller for motivating said structure disposed at the rear of the same and below the water level, an upwardly inclined shaft positioned in the space between said pontoons and having its rear end connected to said propeller, a gear on the upper end of said shaft disposed above the water level substantially midway of the length of the pontoon structure, gearing projecting above the pontoon structure and disposed directly over said shaft gear and in meshing relation therewith, said gearing including means for motivating the same to propel the vehicle through the water, a sealed lubricant containing tube for inclosing said propeller shaft and a gear housing for inclosing said gear on the upper end of said inclined shaft and having the upper end of said tube sealed therein with said shaft projecting beyond said latter seal and carrying said gear, said housing shaft and propeller comprising a single assembly and being adjustable as a unit in the space separating said pontoons.

GUST W. MATTSON.